(12) United States Patent
Wedi et al.

(10) Patent No.: US 6,430,413 B1
(45) Date of Patent: *Aug. 6, 2002

(54) MOBILE RADIO RECEIVER FOR CELLULAR RADIO TELECOMMUNICATIONS SYSTEMS

(75) Inventors: Christoph Wedi, Bocholt; Andreas Merker, Horstmar, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,988
(22) PCT Filed: May 29, 1996
(86) PCT No.: PCT/DE96/00931
§ 371 (c)(1),
(2), (4) Date: Nov. 20, 1997
(87) PCT Pub. No.: WO96/38991
PCT Pub. Date: Dec. 5, 1996

(30) Foreign Application Priority Data

May 31, 1995 (DE) ........................................ 195 19 965

(51) Int. Cl.[7] .................................................. H04Q 7/22
(52) U.S. Cl. ...................... 455/442; 455/525; 455/67.1; 455/462; 455/427; 455/554; 370/331
(58) Field of Search ................................. 455/442, 436, 455/437, 462, 525, 67.1, 422.27, 554; 370/331, 332, 333, 334, 347

(56) References Cited

U.S. PATENT DOCUMENTS

| | | | |
|---|---|---|---|
| 5,117,502 A | 5/1992 | Onoda et al. | |
| 5,416,778 A | * 5/1995 | Chan et al. | 370/332 X |
| 5,479,410 A | * 12/1995 | Paavonen | 370/332 |
| 5,483,668 A | * 1/1996 | Malkamaki et al. | 455/442 |
| 5,483,688 A | 1/1996 | English et al. | |

FOREIGN PATENT DOCUMENTS

| | | |
|---|---|---|
| EP | 0 576 079 A1 | 12/1993 |
| EP | 0 577 322 A1 | 1/1994 |
| EP | 0 615 396 A1 | 9/1994 |
| JP | 01-321739 | 12/1989 |
| JP | 03-268697 | 11/1991 |
| JP | 05-130255 | 5/1993 |
| JP | 06-78360 | 3/1994 |
| JP | 06-169485 | 6/1994 |
| JP | 06-276120 | 9/1994 |

* cited by examiner

Primary Examiner—William Trost
Assistant Examiner—Philip J. Sobutka
(74) Attorney, Agent, or Firm—Schiff Hardin & Waite (57) ABSTRACT

For mobile radio receivers ($MT_m$) which are used in a cellular radio telecommunications system, in order to allow interruption-free relaying of a telecommunications link, in particular even if stationary radio transmitters (U-BS, H-BS) which are arranged in the cellular telecommunications system are not synchronized (asynchronous radio telecommunications system), the mobile radio receiver ($MT_m$) has, in particular, first to third devices (FKT, SST, BMC, ZST, µP, SPGM, SWS). Using these devices, it is possible to receive all those radio messages which are transmitted for possible radio links at frequencies, in time slots and/or in channels by the radio transmitter (U-BS, H-BS) and allow radio links to be set up. In consequence, the mobile radio receiver is able to set up, in addition to a first radio link which is used as a telecommunications link, at least one second radio link, which is intended to be used as a telecommunications link, in the background.

21 Claims, 8 Drawing Sheets

MOBILE RADIO RECEIVER FOR CELLULAR RADIO TELECOMMUNICATIONS SYSTEMS

BACKGROUND OF THE INVENTION

The invention relates to a mobile radio receiver for cellular radio telecommunications systems according to the precharacterizing clause of patent claim 1.

Two of the currently most powerful wire-free telecommunications systems are the mobile radio system based on the GSM Standard (Global System for Mobile Communication; see Informatik Spektrum [Information Spectrum] 14 (June 1991), No. 3, Berlin; A. Mann: "Der GSM-Standard—Grundlage für digitale europäische Mobil-funknetze" [The GSM Standard—Basis of European digital mobile radio networks]; pages 137 to 152) and the cordless telephone system based on the DECT Standard (Digital Enhanced (previously: European) Cordless Telecommunications; cf. (1): Nachrichtentechnik Elektronik [Electronic Information Technology] 42 (January/February 1992), No. 1, Berlin; U. Pilger: "Struktur des DECT-Standards" [Structure of the DECT Standard]; pages 23 to 29 in conjunction with the ETSI Publication ETS 300175-1 . . . 9, October 1992; (2): Siemens Components 31 (1993), No. 6; S. Althammer and D. Brückmann: "Hochoptimierte IC's für DECT-Schnurlostelefone [Highly optimized ICs for DECT cordless telephones]", pages 215 to 218; (3): telecom report 16 (1993), No. 1, J. H. Koch: "Digitaler Komfort für schnurlose Telekommunikation —DECT-Standard eröffnet neue Nutzungsgebiete [Digital convenience for cordless telecommunications—DECT Standard opens up new fields of use]", pages 26 and 27), both of which transmit radio messages inter alia using the TDMA method (Time Division Multiple Access).

However, the present invention is not limited either to these two telecommunications systems or to the TDMA transmission method. The invention thus also extends to those systems which are described in the document TIB-R09067 (5)-P. Bauer-Trocheris: "UMTS-Integrator für die mobile Kommunikation—ein Ausblick auf die Mobilfunk-landschaft nach dem Jahr 2000 [UMTS integrator for mobile communications—a summary of the mobile radio situation after the year 2000]", Report on the Convention "European Mobile Radio, 5th annual meeting of German and European mobile radio industry, FIBA Congresses, Munich, Feb. 24 to 26 1993".

Figure 1:
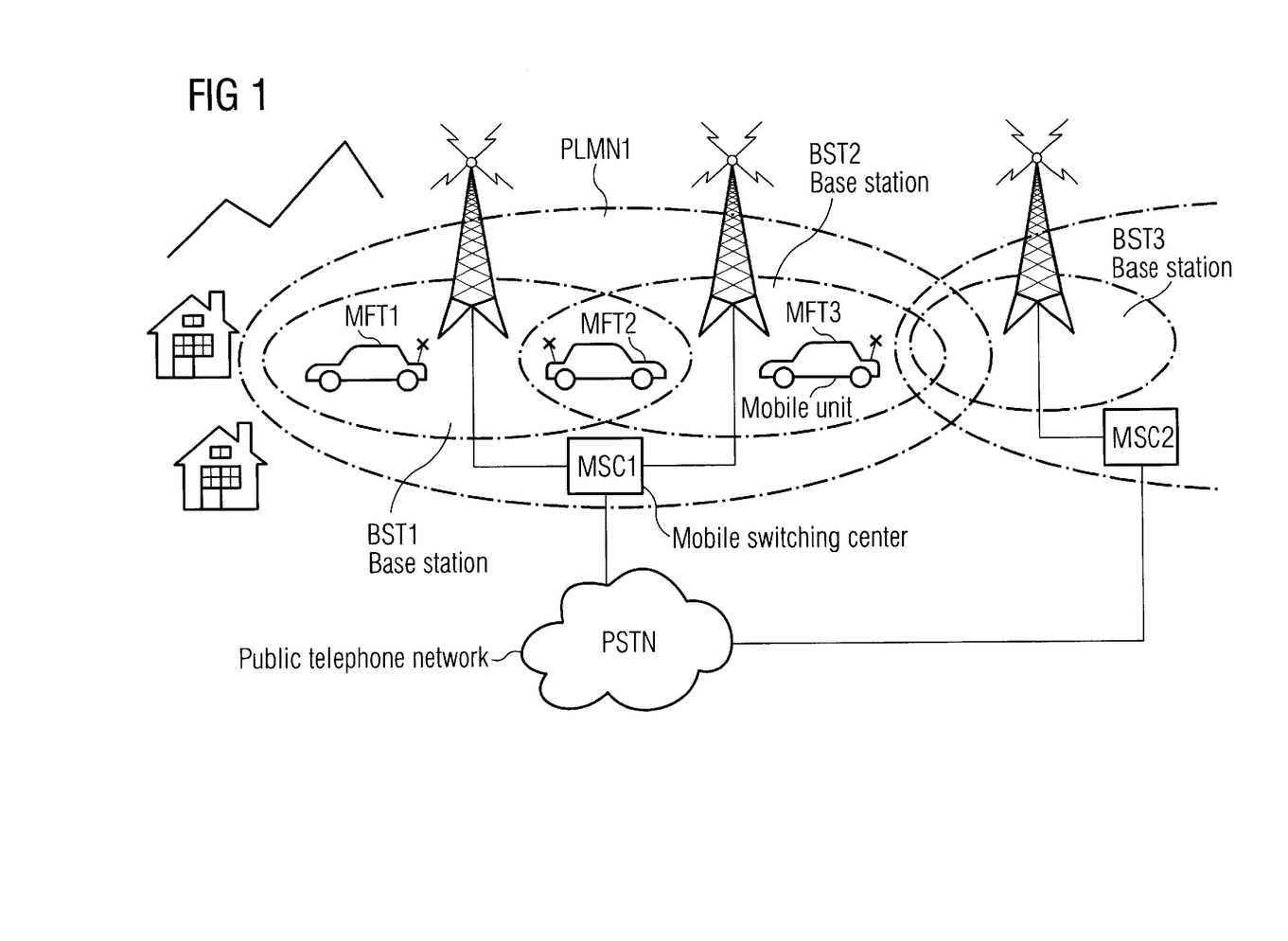
FIG. 1 depicts a GSM mobile radio system.

The GSM mobile radio system is a digital cellular system in which, according to FIG. 1 (see tec February 1993—The technical magazine Ascom "Wege zur universellen mobilen Telekommunikation" [Ways for universal mobile telecommunication], pages 35 to 42) a large number of base stations BST1 . . . BST3 are split into cells in a cellular supply region. The cells and the base stations BST1 . . . BST3 are connected to one another and to the outside world via a mobile switching center MSC1, MSC2 (Mobile Switching Center). For an efficient network design, usually a number of these mobile switching centers MSC are combined in a public state-based mobile network PLMN1, PLMN2 (Public Land Mobile Network). Furthermore, the mobile switching centers MSC1, MSC2 are linked to a public telephone network PSTN (Public Switched Telephone Network). A mobile radio part MFT1 . . . MFT3, from which a call is normally passed, is, as a rule, operated by that base station with which the best radio link can be maintained. In GSM mobile radio, the users under some circumstances move at high speed in the cellular supply region. This leads to a number of mobile radio cells being traversed during a call. In order to ensure an interruption-free handover from one adjacent cell to another adjacent cell (seamless handover), special protocols are required between the mobile radio part and the base station.

The DECT-specific cordless telephone system is a digital system which, according to FIG. 1 (cf. tec February 1993—Technical Magazine from Ascom "Wege zur universellen mobilen Telekommunikation [Ways for universal mobile telephone communication]", pages 35 to 42) can be used in the private area (for example house, apartment, garden etc.), in the small public area (for example companies, office building etc.) and as a telepoint application.

The basic structure of the cordless telephone system comprises a base station BS (FP=Fixed Part with FT=Fixed Termination) and a mobile part MT (PP=Portable Part with PT=Portable Termination) with the capability for telecommunications with the base station BS. This basic structure can be extended in accordance with the DECT Standard in such a manner that up to twelve such mobile parts MT are assigned to a single base station BS.

Figure 3:
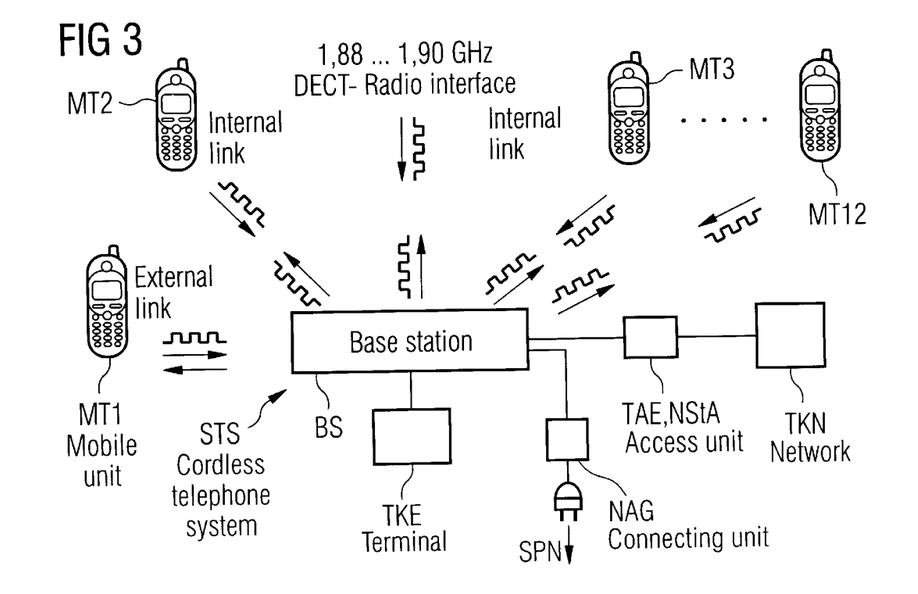
FIG. 3 depicts a cordless telephone system.

FIG. 3 shows such a cordless telephone system STS, in which a maximum of 12 links using the TDMA/FDMA/TDD method (Time Division Multiple Access/Frequency Division Multiple Access/Time Division Duplex) are set up on one DECT base station BS in parallel to DECT mobile parts MT1 . . . MT12 via a DECT radio interface designed for the frequency band between 1.88 and 1.90 GHz. The figure 12 results from a number "k" of time slots or telecommunications channels (k=12) available for duplex operation of a DECT system. The links may in this case be internal and/or external. In the case of an internal link, two mobile parts registered at the base station BS, for example the mobile part MT2 and the mobile part MT3, can communicate with one another. For setting up an external link, the base station BS is connected to a telecommunications network TKN, for example in wire-based form via a telecommunications access unit TAE or a private branch exchange NStA is connected to a wire-based telecommunications network or, in accordance with WO 95/05040, in wire-free form as a repeater station to a higher level telecommunications network. In the case of the external link, it is possible to communicate with a mobile part, for example with the mobile part MT1, via the base station BS and the telecommunications access unit TAE, and for a private branch exchange NStA to communicate with a subscriber in the telecommunications network TKN. If, as in the case of the Gigaset 951 (Siemens cordless telephone, cf. telecom report 16, (1993), issue 1, pages 26 and 27 BS—the base station) has only one connection to the telecommunications access unit TAE or the private branch exchange NStA, then only one external link can be set up. If—as in the case of the Gigaset 952 (Siemens cordless telephone, cf. telecom report 16, (1993), issue 1, pages 26 and 27)—the base station BS has two connections to the telecommunications network TKN, then, in addition to the external link to the mobile part MT1, a further external link is possible from a wire-based telecommunications terminal TKE connected to the base station BS. In this case, it is in principle also feasible for a second mobile part, for example the mobile part MT12, to use the second connection for an external link, instead of the telecommunications terminal TKE. While the mobile parts MT1 . . . MT12 are operated using a battery or a rechargeable battery, base station BS, which is designed as a small cordless switching system, is connected via a mains connecting unit NAG to a power network SPN.

Figure 2:
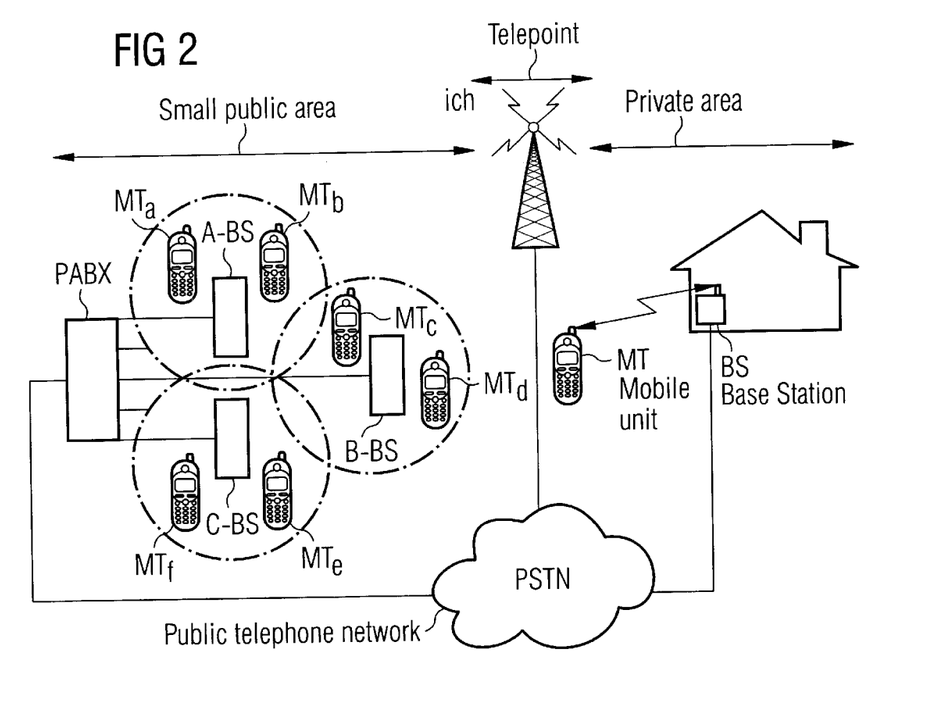
FIG. 2 depicts a small public area system.

The cordless telephone system according to FIG. 3 is preferably used in the private area, according to FIG. 2.

In the small public area—in accordance with FIG. 2—a plurality of such cordless telephone systems according to FIG. 3 can be operated as a cellular system on a private branch exchange PABX (Private Automatic Branch Exchange), the private branch exchange PABX controlling a plurality of base stations A-BS, B-BS, C-BS and, if required, supporting a handover from one base station to another. FIG. 2 also shows six mobile parts $MT_a \ldots MT_f$ which are assigned to the three base stations A-BS, B-BS, C-BS. This results in a cellular cordless telephone system in which the telecommunications link as a rule passes via that base station A-BS, B-BS, C-BS with which the mobile part $MT_a \ldots MT_f$ has the best radio contact.

Figure 4:
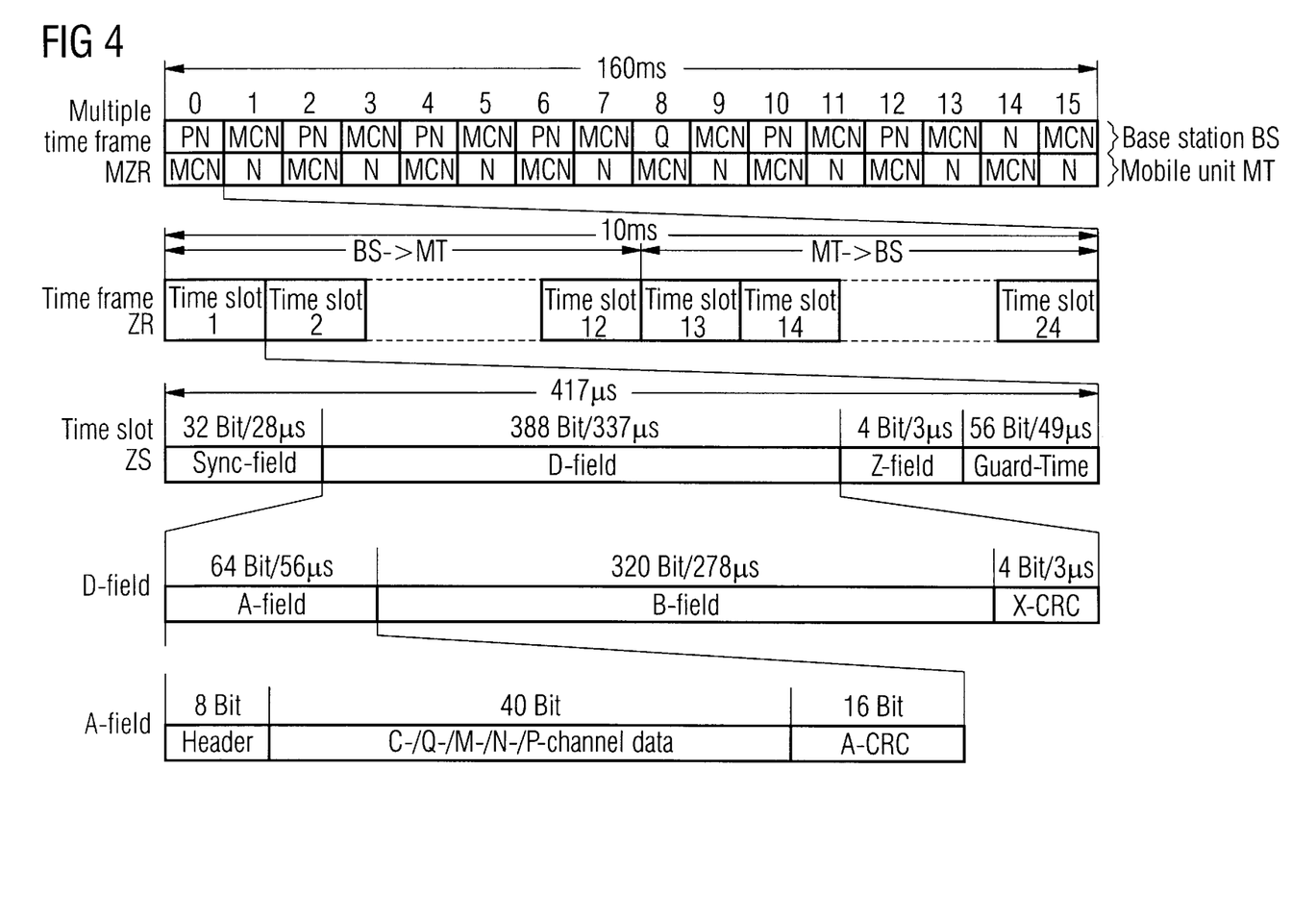
FIG. 4 depicts a TDMA structure of a DECT system.

Based on the document "Nachrichtentechnik Elektronik [Electronic Information Technology]"42 (1992) January/February, No. 1, Berlin, DE; U. Pilger: "Struktur des DECT-Standards [Structure of the DECT Standard]", pages 23 to 29 in conjunction with the ETS 300 175-1 . . . 9, October 1992 FIG. 4 shows the TDMA structure of the DECT system STS. In terms of multiple access methods, the DECT system is a hybrid system in which radio messages can be transmitted on ten frequencies in the frequency band between 1.88 and 1.90 GHz using the FDMA principle and, according to FIG. 4, in a predetermined time sequence using the TDMA principle, from the base station BS to the mobile part MT and from the mobile part MT to the base station BS (duplex operation). The time sequence is in this case governed by a multiple time frame MZR, which occurs every 160 ms and which has 16 time frames ZR, each having a time duration of 10 ms. Information is transmitted separately in these time frames ZR to the base station BS and to the mobile part MT, this information relating to a C, M, N, P and Q channel defined in the DECT Standard. If information for a number of these channels is transmitted in one time frame ZR, then the transmission takes place based on a priority list where M>C>N and P>N. Each of the 16 time frames ZR in the multiple time frame MZR is in turn split into 24 time slots ZS each having a time duration of 417 µs, of which 12 time slots ZS (time slots 0 . . . 11) are reserved for the transmission direction "base station BS→mobile part MT" and a further 12 time slots ZS (time slots 12 . . . 23) are reserved for the transmission direction "mobile part MT→base station BS". Information having a bit length of 480 bits is transmitted in each of these time slots ZS, in accordance with the DECT Standard. Of these 480 bits, 32 bits are transmitted as synchronization information in a SYNC field, and 388 bits as wanted information in a D field. The remaining 60 bits are transmitted as additional information in a Z field and as guard information in a "Guard Time" field. The 388 bits in the D field transmitted as wanted information are in turn split into a 64-bit long A field, and a 320-bit long B field and a 4-bit long "X-CRC" word. The 64-bit long A field is composed of an 8-bit long data header, a 40-bit long data set with data for the C, Q, M, N and P channels and a 16-bit long "A-CRC" word.

Figure 5:
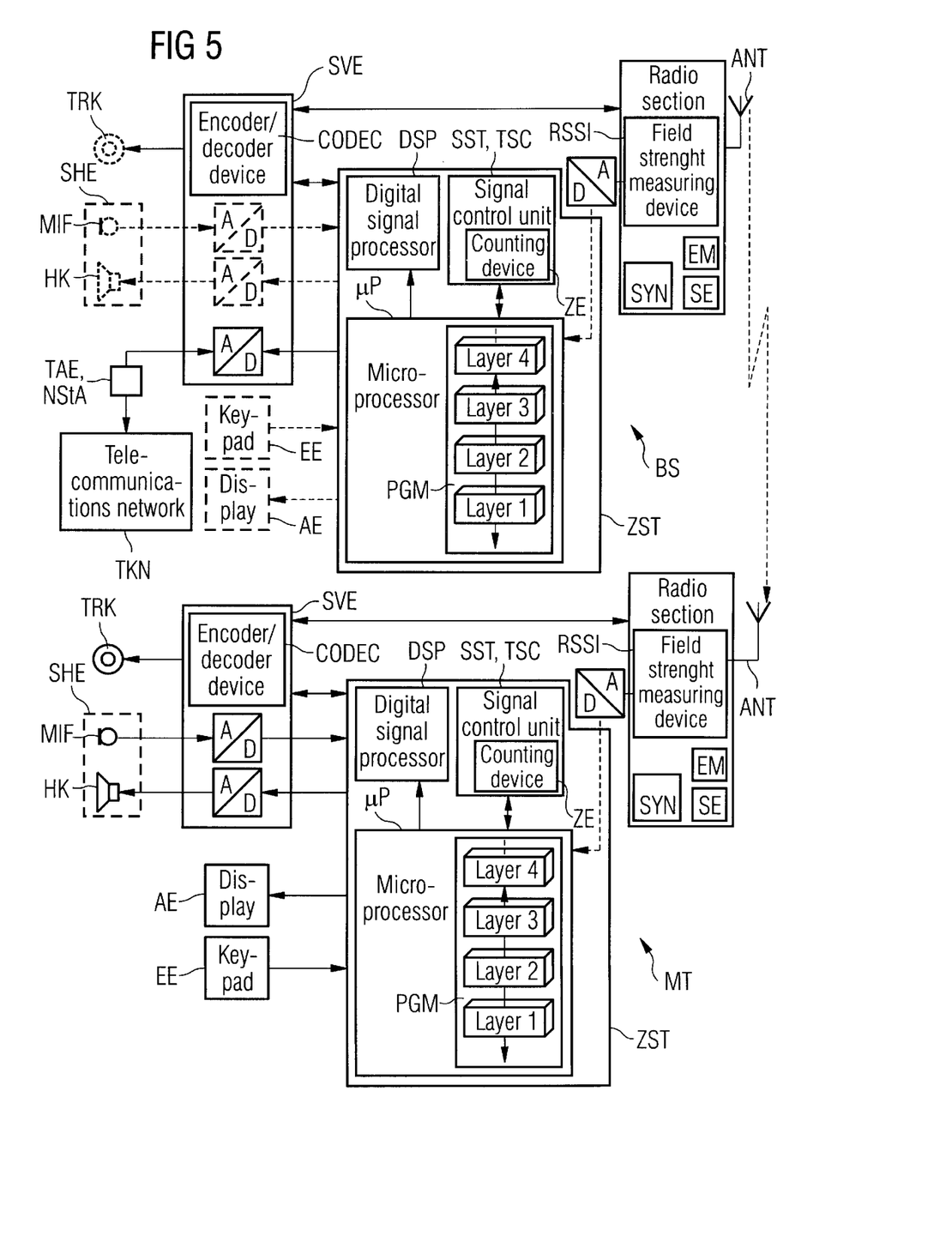
FIG. 5 is a block diagram of a telecommunications network, a DECT system according to FIG. 3, based on FIG. 5.

Based on the document Components 31 (1993), Issue 6, pages 215 to 218; S. Althammer, D. Brückmann: "Hochoptimierte IC's für DECT-Schnurlostelefone [Highly optimized ICs for DECT cordless telephones]", FIG. 5 shows the basic circuit layout of the base station BS and of the mobile part MT. According to this, the base station BS and the mobile part MT have a radio section FKT with an antenna ANT which is associated with transmission and reception of radio signals, a signal processing device SVE and a central controller ZST, these items being linked to one another in the manner illustrated. The radio section FKT essentially contains known devices such as the transmitter SE, receiver EM and synthesizer SYN as well as a field strength measuring device RSSI (Radio Signal Strength Indicator), which are linked with one another in a known manner. The signal processing device SVE contains, inter alia, an encoder/decoder device CODEC. The central controller ZST has a microprocessor µP both for the base station BS and for the mobile part MT, with a program module PGM designed in accordance with the OSI/ISO layer model (cf. (1): Information leaflets—Deutsche Telekom year 48, February 1995, pages 102 to 11; (2): ETSI Publication ETS 300175-1 . . . 9, October 1992), a signal control section SST and a digital signal processor DSP, which are linked to one another in the manner illustrated. Of the layers defined in the layer model only the first four layers, which are absolutely essential for the base station BS and the mobile part MT are illustrated. The signal control section SST in the base station BS is designed as a Time Switch Controller TSC, and that in the mobile part MT is designed as a Burst Mode Controller BMC. The major difference between the two signal control sections TSC, BMC is that the base-station-specific signal control section TSC also carries out switching functions (switch functions) in comparison with the mobile-unit-specific signal control section BMC. The signal control sections TSC, BMC each contain a counting device ZE with a bit, time slot and time frame counter.

The basic method of operation of the circuit units mentioned above is described, for example, in the document cited above, Components 31 (1993), Issue 6, pages 215 to 218.

The described circuit layout according to FIG. 5 in the base station BS and the mobile part MT is supplemented by additional functional units in accordance with their function in the DECT system according to FIG. 3.

The base station BS is connected to the telecommunications network TKN via the signal processing device SVE and the telecommunications access unit TAE or the private branch exchange NStA. As an option, the base station BS may also have an operator interface (functional units shown by dashed lines in FIG. 5), which comprises, for example, an input device EE designed as a keypad, an indicating device AE designed as a display, and speech/listening device SHE designed as a handset with microphone MIF and an earpiece HK, as well as a ringer bell TRK.

The mobile part MT has the operator interface (which is possible as an option for the base station BS) with the control elements which are part of this operator interface and are described above.

Like the base station BS in the private area, the private branch exchange PABX according to FIG. 2 is connected to the wire-based public telephone network PSTN (Public Switched Telephone Network). In this way, anyone can become his own network operator by obtaining a cordless telecommunications system comprising the private branch exchange PABX and the cordless telephones A-BS, B-BS, C-BS, $MT_a \ldots MT_f$ connected to it.

In order to make it possible to dispense with network coordination in this case, according to the DECT Standard, the Dynamic Channel Allocation method (DCA method) is provided. If, for example, a DECT link is being set up, a search is carried out for that frequency and that time window having the least interference. The level (intensity) of the interference depends primarily on whether (a) a conversation is already being carried out on another base station, or (b) as a result of movement, a mobile part comes into visual contact with a base station that was previously screened.

Any increase in interference resulting from this can be countered using the TDMA transmission method on which the DECT cordless telephone system is based. According to the TDMA method, only one time slot is used for the actual transmission; the other eleven time slots can be used for measurements. In consequence, it is possible to determine an alternative frequency/time slot pair, to which the link can be switched. This is done in the course of adaptive channel allocation in accordance with the DECT Standard (cf. (1) Nachrichtentechnik Elektronik [Electronic Information Technology] 42 (January/February 1992), No. 1, Berlin; U. Pilger: "Struktur des DECT-Standards [Structure of the DECT Standard]"; page 28, paragraph 3.2.6) and (2) EP-0 576 079 A1) by means of a "Connection Handover" (Intra-Cell Handover).

In addition to this "Intra-Cell Handover", the "Inter-Cell Handover" or the seamless handover may also be mentioned, which is likewise possible in the course of DECT-specific adaptive channel allocation.

In order now to address in particular the "Inter-Cell Handover" problem which occurs regularly in cellular wire-free telecommunications systems according to EP-0 577 322 A1, the mobile radio receiver (mobile part) provided for such cellular radio telecommunications systems, must be able to change the base station, subject to a cell change within the cellular radio system, at any time during an active telecommunications link to a (quasi-) stationary radio transmitter (base station) (setting up a telecommunications link to another base station) while, at the same time, passing on the already existing active telecommunications link without any interruption (seamlessly) to the other base station (seamless handover). In this context, EP-0 577 322 A1 discloses the "handover" being controlled by base stations involved and/or by a central mobile switching center (Mobile Switching Center MSC) connected to the base stations and, alternatively, by the relevant mobile part itself.

According to the document Nachrichtentechnik Electronik "[Electronic Information Technology] 42 (January/February 1992) No. 1, Berlin; U. Pilger: "Struktur des DECT-Standards [Structure of the DECT Standard]"; page 28, paragraph 3.2.6, the DECT Standard provides for this purpose that the mobile part autonomously sets up a second telecommunications link, in parallel with the existing link, in the event of any deterioration in the transmission quality of the existing telecommunications link, on the basis of indicators of the transmission quality (for example signal field strength, CRC values, etc.). In the case of this "Inter-Cell Handover" procedure, the fact that DECT mobile parts are continuously informed of the status of the channels available in the current environment in the course of the dynamic, decentralized channel allocation process (DCA method), is used in such a manner that the second link is set up on the basis of the entry in a channel list.

An interruption-free handover is possible using the above procedure only if the mobile part is located in a cellular radio system with synchronized base stations. In such a synchronous cellular radio system, the mobile part can then, in addition to the already existing telecommunications link to a base station (originating base station), set up at least one further link to another base station in another radio cell without losing the synchronism with the originating base station in the process. Such a synchronous cellular radio system can, however, be implemented only with considerable system complexity (cable or radio synchronization).

SUMMARY OF THE INVENTION

The object on which the invention is based is to provide mobile radio receivers for cellular radio telecommunications systems which allow interruption-free intercellular relaying (seamless "intercell-Handover") in particular even when (quasi-)stationary radio transmitters arranged in the cellular radio telecommunications system are not synchronized (asynchronous radio telecommunications system).

In general terms a mobile radio receiver for cellular radio telecommunications systems, which can communicate with a large number of (quasi-) stationary radio transmitters. The (quasi-) stationary radio transmitters are arranged in radio cells of the radio. telecommunications system for radio-cell-related transmission of radio messages which are included in a multiplex structure having a plurality of structure elements and allow telecommunications connections to be set up between the stationary radio transmitters and a mobile radio receiver. Each of the transmitters are connected to a telecommunications network, synchronously or asynchronously with respect to one another, via a switching center. A functional unit has the following means: first means for receiving and processing the radio messages; second means for producing and controlling the radio links to the (quasi-) stationary radio transmitters; and third means for detecting and evaluating additional information which indicates the radio link quality and is contained in the radio messages. A first radio link is produced and maintains a first (quasi-) stationary radio transmitter on the basis of receiving a first radio message which is included in first structure elements of the multiplex structure. This first radio link is used as a telecommunications link. The first to third means are designed and connected to one another such that in addition to the first radio link, at least one second radio link to at least one second (quasi-) stationary radio transmitter is produced and maintained in the background on the basis of receiving radio messages which are included in the second to n-th structure elements of the multiplex structure. The second radio link is intended to be used as a telecommunications link. Depending on the comparison between the link quality of the first radio link and the link quality of the second radio link, the respective link quality is determined from the evaluation of the respective radio-link-specific additional information. Either the first radio link continues to be used as the telecommunications link, or the second radio link is used as a new telecommunications link. The first to third means are designed such that the first radio link to the first (quasi-) stationary radio transmitter is controlled (bearer handover) by a cyclic reception change from the first radio message, which is included in the first structure element of the multiplex structure, to one of the radio messages which are included in the second to n-th structure elements of the multiplex structure.

In an alternative embodiment the second means have a number of counting devices corresponding to the number of radio links.

In another alternative embodiment the second means have a counting device and an offset store which is allocated to this counting device.

Advantageous developments of the present invention are as follows.

The first to third means are designed in such, a manner that the first radio link to the first (quasi-)stationary radio transmitter is controlled (Bearer Handover) by a cyclic reception change from the first radio message, which is included in the first structure element of the multiplex structure, to one of the radio messages which are included in the second to n-th structure elements of the multiplex structure.

The second means have a number of counting devices corresponding to the number of radio links.

The second means have a counting device and an offset store which is allocated to this counting device.

The counting devices each comprise a bit, time slot and a time frame counter.

The counting device is designed as a bit counter, and the offset store carries out the functions of a time slot and time frame counter.

The counting device and, possibly, the offset store are designed as software modules.

The counting device and, possibly, the offset store are designed as hardware modules.

The first to third means are designed and connected to one another such that the second radio link or links to the second (quasi-)stationary radio transmitter or transmitters is or are produced and maintained as a function of at least one predetermined additional-information-related threshold value being exceeded by an additional information value, which is obtained from the additional information received with the radio messages via the first radio link.

The first to third means are designed and connected, to one another in such a manner that the second radio link or links to the second (quasi-) stationary radio transmitter or transmitters is or are produced and maintained as a function of at least one predetermined additional-information-related threshold value being undershot by an additional information value, which is obtained from the additional information received with the radio messages via the first radio link.

The cellular radio telecommunications system is designed as a cellular cordless telecommunications system, the (quasi-)stationary radio transmitter is designed as a cordless base station, and the mobile radio receiver is designed as a cordless mobile part.

The cordless base station and the cordless mobile part are designed as cordless devices for transmitting radio messages in accordance with the DECT Standard.

The cellular radio telecommunications system is designed as a cellular mobile radio telecommunications system, the (quasi-) stationary radio transmitter is designed as a mobile radio base station, and the mobile radio receiver is designed as a mobile radio mobile part.

The mobile radio base station and the mobile radio mobile part are designed as mobile radio devices for transmitting radio messages in accordance with the GSM Standard.

The telecommunications network is designed as a public telephone network, ISDN network, private telecommunications network, mobile radio network or satellite radio network, and the switching center is designed as a private branch exchange.

The wanted information transmitted in the course of the telecommunications link represents spoken words, written words and/or images.

The multiplex structure is designed as an structure, and the structure elements contained in the multiplex structure are designed as time slots/channels.

By contrast with previously known mobile radio receivers, described initially, the mobile radio receiver which achieves the object according to the invention is able (at any time and as a result of the fact that, in particular, the first to third means can receive all the radio messages transmitted for possible radio links on frequencies, in time slots and/or in channels by a radio transmitter and allow radio links to be set up) to set up in the background (in addition to a first radio link used as a telecommunications link to a first (quasi-)stationary radio transmitter) at least one second radio link, which is intended to be used as a telecommunications link, to at least one second (quasi-) stationary radio transmitter, in particular within an asynchronous cellular radio telecommunications system. In this case, it is irrelevant for the proposed solution principle whether (1) the cellular wire-free telecommunications system is a radio system in accordance with the DECT Standard or the GSM Standard, (2) the radio messages which are transmitted from the stationary radio transmitters to the mobile radio receivers and allow radio links to be set up between the radio transmitter and the radio receiver are transmitted in accordance with the TDMA method, the CDMA method or a hybrid (for example FDMA/TDMA/CDMA method) access method.

In this case, it is advantageous if the mobile radio receiver carries out a DECT-specific "Bearer Handover" in order to prevent the masking (concealment), which occurs according to static viewpoints, of other radio messages by the radio link, which is used as a telecommunications link.

In addition, it is advantageous if the mobile radio transmitter/radio receiver has a number of counting devices intended to match the number of radio links and telecommunications links to be set up. In the normal case (handover case), two counting devices are provided in the mobile radio receiver (mobile part) according to FIGS. 7 and 8, these being required to set up telecommunications links to two (quasi-)stationary radio transmitters (base stations).

As an alternative to the solution, it is also possible to provide a single counting device in conjunction with an offset store, which is allocated to this counting device, in the mobile radio transmitter/radio receiver, for setting up the telecommunications links.

It is advantageous to set up the second telecommunications link at least after exceeding a threshold value defined with respect to reciprocal signal field strength values and/or CRC values or after undershooting at least one threshold value defined with respect to signal field strength values and/or reciprocal CRC values.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 6:
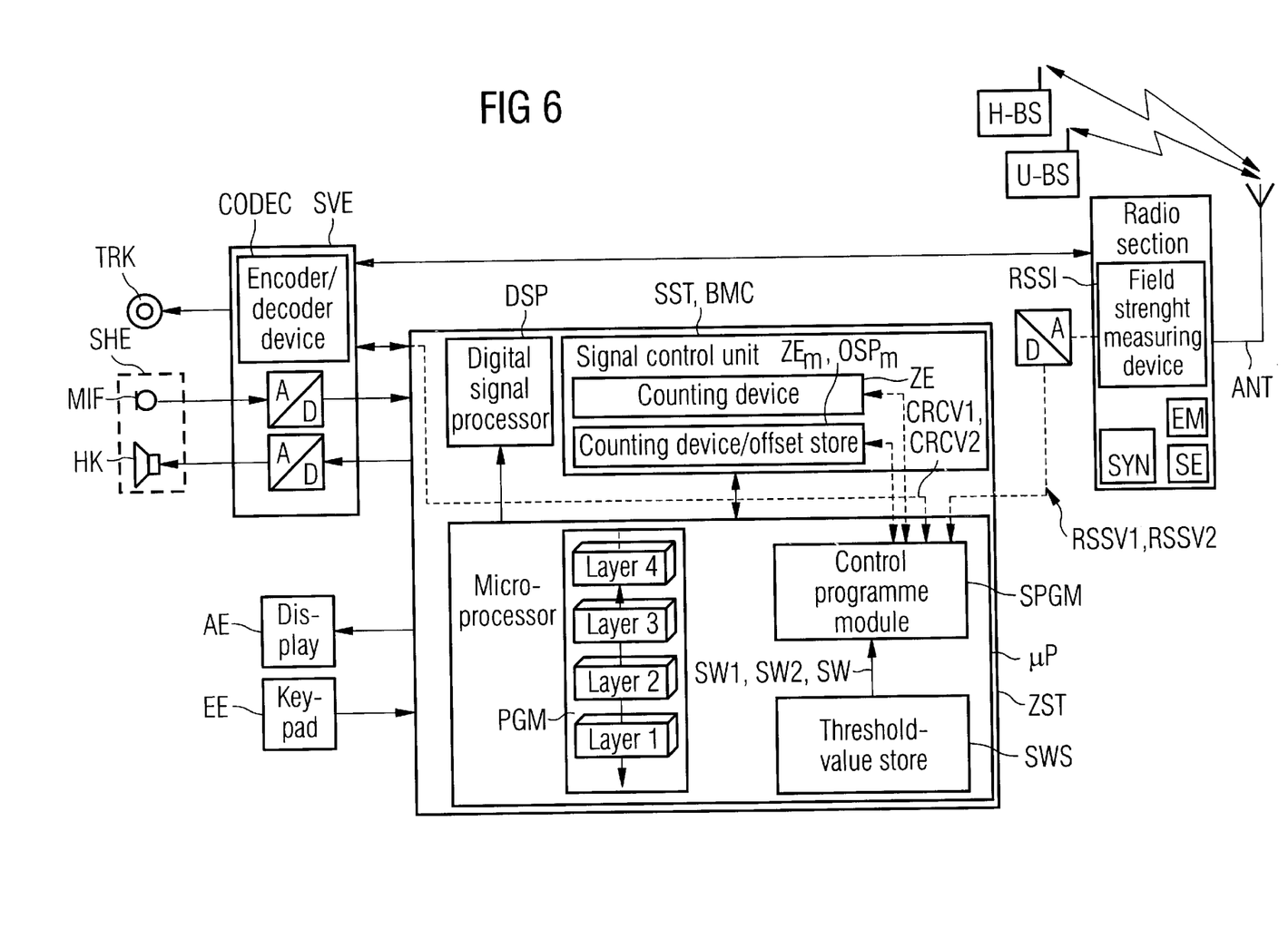
FIG. 6 shows a modified mobile part, designed as a multisynchronization mobile part (multisync mobile part) for operation in radio telecommunications systems, in particular asynchronous systems.

Based on FIG. 5, FIG. 6 shows a modified mobile part $MT_m$ designed as a multisynchronization mobile part (multisync mobile part) for operation in radio telecommunications systems, in particular asynchronous systems. In comparison with the mobile part MT according to FIG. 5, the multisync mobile part $MT_m$ contains, in the signal control section SST, BMC and in addition to the counting device ZE, a further counting device $ZE_m$ or, alternatively, an offset store SP designed, for example, as a bit register. The two counting devices ZE, $ZE_m$ or the counting device ZE and the offset store SP are driven by a control program module SPGM in the microprocessor $\mu P$ in the central controller ZST. This drive by the control program module SPGM is dependent on the comparison between a field strength value RSSV1, RSSV2 (Radio Signal Strength Value) (which is measured by the field strength measuring device RSSI and is subsequently converted from analog to digital form) and a threshold value SW1 which is stored in the threshold value store SWS and is related to the field strength value.

The two counting devices ZE, $ZE_m$ or the counting device ZE and the offset store SP can be driven by the control program module SPGM alternatively either as a function of the comparison between a CRC value CRCV1, CRCV2 (Cycle Redundancy Check Value) contained in the received radio message and a threshold value SW2 stored in the threshold value memory SWS and related to the CRC value, or, in addition, as a function of the comparison between the CRC value CRCV1, CRCV2 and the threshold value SW2. There is a reciprocal relationship between the CRC value and the field strength value which are contained as additional information in the radio message transmitted between the base station BS and the multisync mobile part $MT_m$. As the transmission distance between the base station BS and the multisync mobile part $MT_m$ increases, the field strength value RSSV1, RSSV2 becomes smaller while the CRC value CRCV1, CRCV2 becomes larger.

By virtue of the two counting devices ZE, $ZE_m$ and their drive by the control program module SPGM, the multisync mobile part $MT_m$ is able to set up two telecommunications links to two base stations independently of one another, which belong, for example according to FIG. 2, to different radio cells. This allows an interruption-free radio cell change during a call. For example, it is possible to maintain a voice link to an originating base station U-BS and at the same time, to set up a handover link to a handover base station H-BS in the background. With regard to setting up telecommunications links in this way, it is irrelevant whether the two base stations are or are not synchronized. In other words, a multisync mobile part $MT_m$ is able to set up the telecommunications links both in a synchronous, wire-free, cellular telecommunications system and in an asynchronous wire-free, cellular telecommmunications system.

The search for the handover base station H-BS can be initiated in an advantageous manner as a function of a threshold value SW, which is defined with respect to reciprocal signal field strength values and/or CRC values, being exceeded, or after undershooting a threshold value SW, which is defined with respect to signal field strength values and/or reciprocal CRC values.

This results in the following advantages. It is possible to use standard base stations without any radio or cable synchronization. Furthermore, a system extension with a multisync mobile part can be achieved retrospectively, without having to replace or adapt already existing systems. Users of such a mobile part, who need a cell change during the call, can be equipped with such a multisync mobile part without the rest of the system being influenced.

The way in which the multisync mobile part $MT_m$ sets up these telecommunications links will be explained in detail on the basis of FIG. 4 and with reference to FIGS. 7 to 9.

Figure 7:
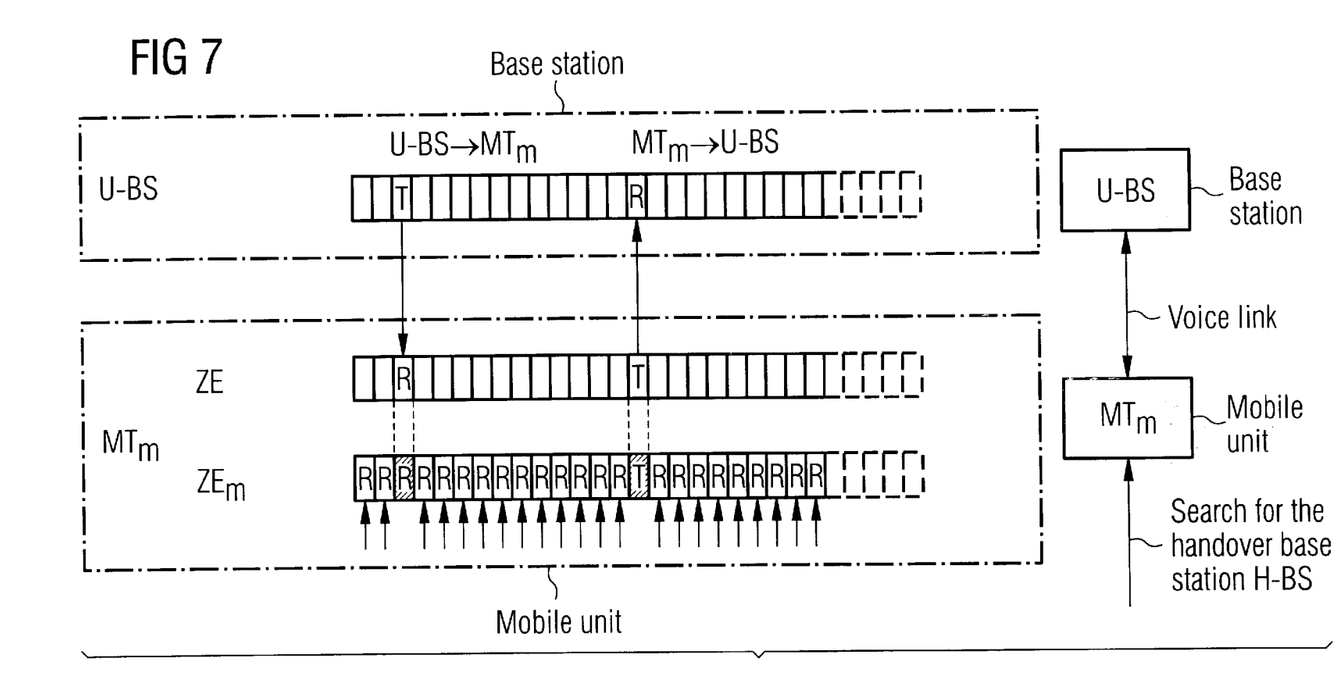
FIG. 7 shows the setting up of a telecommunications link between the multisync mobile part according to FIG. 6 and the base station according to FIG. 5 during the "multisync mobile part in the search state" situation.

FIG. 7 shows the situation when the multisync mobile part $MT_m$ is searching for the handover base station H-BS during the call link to the originating base station U-BS.

By means of the counting device ZE in the signal control section SST, BMC according to FIG. 5, the multisync mobile part $MT_m$ has a duplex telecommunications link to the originating base station U-BS in the time slots 3 and 15.

By means of the further counting device $ZE_m$ in the signal control section SST, BMC according to FIG. 5, the multisync mobile part $MT_m$ has the capability to search for the handover base station H-BS in the remaining time slots— these being the time slots 1, 2, 4 to 14 and 16 to 24. In this case, apart from the two time slots allocated to the dedicated link, all the remaining time slots are switched to receive by the multisync mobile part $MT_m$, in order to make it possible to receive a second radio cell, irrespective of the timing. Since other radio cells, whose carriers are transmitted during the dedicated time slot, cannot be received, overlapping of the time slots can be prevented by appropriate control of the dedicated link. This can be controlled by a corresponding time slot change of the dedicated link by the multisync mobile part $MT_m$ (bearer handover).

Figure 8:
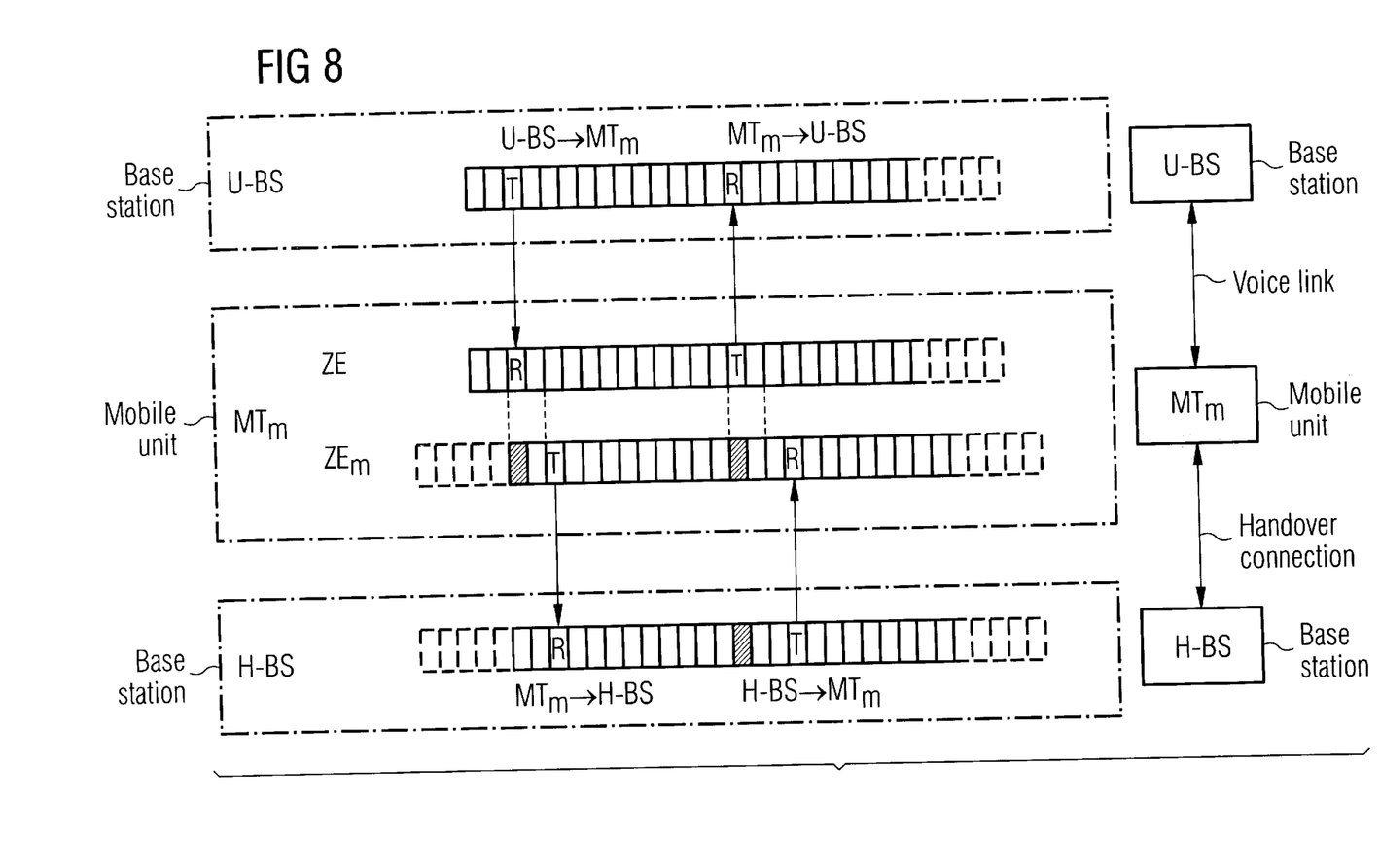
FIG. 8 shows the setting up of two telecommunications links between the multisync mobile part according to FIG. 6 and an originating base station, as well as a handover base station according to FIGS. 2 and 5 during the "multisync mobile part during handover" situation.

FIG. 8 shows the situation when the multisync mobile part $MT_m$. carries out a handover link to the handover base station H-BS during the call link to the originating base station U-BS. The time bases of the two base stations U-BS, H-BS drift apart from one another (time difference between the time frames). In other words, the base stations U-BS, H-BS are asynchronous. In the present case, a duplex telecommunications link between the handover base station H-BS and the multisync mobile part $MT_m$. is produced using the counting device $ZE_m$, for example in the time slots 4 and 16.

The production of the duplex telecommunications link to the handover base station H-BS can once again be carried out in an advantageous manner related to threshold values. In principle, there are two possible options for this.

The first option is for the duplex telecommunications link to be produced as a function of the threshold value SW defined with respect to reciprocal signal field strength values and/or CRC values being exceeded, or after a threshold value SW defined with respect to signal field strength values and/or reciprocal CRC values is undershot.

The second option is for the duplex telecommunications link to be produced as a function of a further threshold value SW defined with respect to reciprocal signal field strength values and/or CRC values being exceeded, or after a further threshold value SW defined with respect to signal field strength values and/or reciprocal CRC values is undershot.

Figure 9:
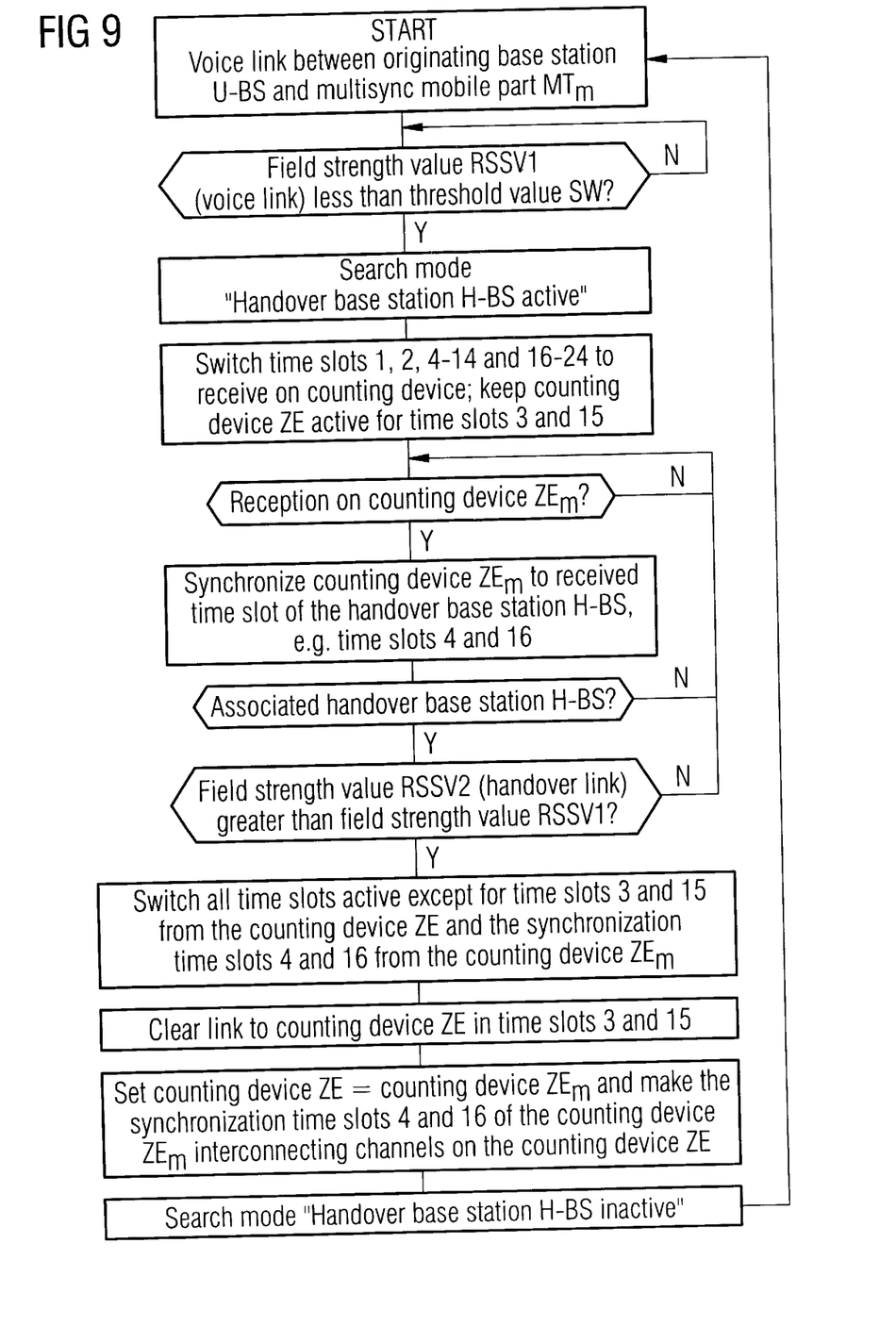
FIG. 9 shows a function flow chart of the multisync mobile part according to FIG. 6 for setting up the two radio links according to FIG. 8.

On the basis of FIGS. 6 to 8 and with the alternatives outlined above, FIG. 9 shows one possible flow chart for the multisync mobile part $MT_m$ for searching of the handover base station H-BS and for producing the duplex telecommunications link to this handover base station H-BS.

While the search mode is active, all the RF and DECT control signals are derived from the counting device $ZE_m$ and the associated control registers with the exception that, for the active link channel on the counting device ZE, for example time slot 3 and 15, a change is made to the counting device ZE and the RF and DECT control signals are derived from the counting device ZE and its control signals. If the search mode is inactive, all the RF and DECT control signals are derived exclusively from the counting device ZE and its control signals. In principle, the counting device $ZE_m$ comprises bit, time slot and time frame counters (bits 0 to 480, time slots 1 to 24, time frames 0 to 15), it being possible by an offset control of the software to allow the time frame counter or the time slot and time frame counter to be omitted.

As an alternative to the embodiment described above, the following embodiment is also possible on the basis of FIG. 6, in which the counting device $ZE_m$ is replaced by an offset store $OSP_m$ designed as a register.

If a mobile part is synchronized when searching for a handover base station, then the current bit value of the counting device ZE is saved in the register $OSP_m$. Theoretically, this register has to have a size of 9 bits in order to allow the maximum bit counter value of a time slot (480 bits) to be stored. However, since a synchronization window of less than ±32 bits is normally used, it is, alternatively, sufficient to save the last 6 bits of the counting device ZE. The normal synchronization position is at the end of the sync word, at the bit position 32 (decimal) or 000100000 (binary). There is normally a synchronization window (for example ±4 bits or ±8 bits) around this position now, in which synchronization is allowed. If synchronization takes place now, within this window, to another base station (handover base station), then the mobile part experiences a shift with respect to the originating base station. If, for example, the synchronization takes place at bit position 28 (decimal) or 011100 (binary), then these values are written to the 6 registers. The mobile part now has a shift of 4 bits with respect to the originating base station. The old sync position stored in the register $OSP_m$, in the example the value 28 (decimal) or 01100 (binary), can now be back-loaded to the counting device ZE at a fixed defined point of the counting device ZE at which the last 6 bits once again assume the value 32 (decimal) or 10000000 (binary). This can be done, for example, in the guard field (guard time) at bit position 464 (decimal) 1110100000 (binary), in the same time slot. If, for example, a "slow hopping" radio section is used, which can fill only every other time slot in any case, back-synchronization is also possible in the directly following inactive time slot, for example at the expected sync position.

In a time-slot-related register, it is possible to use a bit to designate the time slot in which synchronization is intended to have a long-term effect on the counting device ZE, and the time slot in which back-synchronization to the old bit value of the counting device ZE is intended to take place.

Instead of a 6-bit register, it is likewise possible to allow a 9-bit counter (up to 480 decimal) to run in parallel with the counting device ZE. This counter may run on without resynchronization in a time slot in which long-term synchronization is not intended to take place. This count can be back-loaded to the counting device ZE at a suitable point, for example in the guard field (guard time). This counter is resynchronized to the counting device ZE again, and by the reception of the sync word, in a time slot to be synchronized.

In both cases, the result is thus that the mobile part maintains the synchronization position of the originating base station even in the event of multiple synchronization within the sync window within one time frame.

The invention is not not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile radio receiver for cellular radio telecommunications systems, comprising:

a plurality of stationary radio transmitters that communicate with one another, the stationary radio transmitters being arranged in radio cells of the radio telecommunications system for radio-cell-related transmission of radio messages which are included in a multiplex structure having a plurality of structure elements and allow telecommunications connections to be set up between the stationary radio transmitters and a mobile radio receiver each of the stationary radio transmitters connected to a telecommunications network, synchronously or asynchronously with respect to one another, via a switching center;

a functional unit having first means for receiving and processing the radio messages, second means for producing and controlling the radio links to the stationary radio transmitters, and third means for detecting and evaluating additional information which indicates radio link quality and is contained in the radio messages;

a first radio link, produced and maintained, to a first stationary radio transmitter based on receiving a first radio message which is included in first structure elements of the multiplex structure, this first radio link being used as a telecommunications link;

the first means, second means and third means are structured and connected to one another such that in addition to the first radio link, at least one second radio link to at least one second stationary radio transmitter is produced and maintained in the background based on receiving radio messages which are included in second to n-th structure elements of the multiplex structure, which second radio link is useable as a telecommunications link, depending on a comparison between link quality of the first radio link and link quality of the second radio link, a respective link quality being determined from evaluation of respective radio-link-specific additional information, either the first radio link continuing to be used as the telecommunications link, or the second radio link being used as a new telecommunications link;

the second means having a number of counting devices corresponding to the number of radio links.

2. The mobile radio receiver for cellular radio telecommunications systems as claimed in claim 1, wherein the first means, second means and third means are structured such that the first radio link to the first stationary radio transmitter is controlled by a cyclic reception change from the first radio message, which is included in the first structure element of the multiplex structure, to one of the radio messages which are included in the second to n-th structure elements of the multiplex structure.

3. The mobile radio receiver for cellular radio telecommunications systems as claimed in claim 1, wherein the first means, second means and third means are structured and connected to one another such that the second radio link or links to the second stationary radio transmitter or transmitters is or are produced and maintained as a function of at least one predetermined additional-information-related threshold value being exceeded by an additional information value, which is obtained from additional information received with the radio messages via the first radio link.

4. The mobile radio receiver for cellular radio telecommunications systems as claimed in claim 1, wherein the first means, second means and third means are structured and connected to one another such that the second radio link or links to the second stationary radio transmitter or transmitters is or are produced and maintained as a function of at least one predetermined additional-information related threshold value being undershot by an additional information value, which is obtained from additional information received with the radio messages via the first radio link.

5. The mobile radio receiver for cellular radio telecommunications systems as claimed in claim 1, wherein the telecommunications network is one of a public telephone network, ISDN network, private telecommunications network, mobile radio network or satellite radio network, and wherein the switching center is a private branch exchange.

6. The mobile radio receiver for cellular radio telecommunications systems as claimed in claim 1, wherein wanted information transmitted over the telecommunications link represents at least one of spoken words, written words and images.

7. The mobile radio receiver for cellular radio telecommunications systems as claimed in claim 1, wherein the multiplex structure is an FDMA/TDMA/TDD structure, and wherein the structure elements contained in the multiplex structure are time slots/channels.

8. The mobile radio receiver for cellular radio telecommunications systems as claimed in claim 1, wherein the cellular radio telecommunications system is a cellular cordless telecommunications system, the stationary radio transmitter is a cordless base station, and the mobile radio receiver is a cordless mobile part.

9. The mobile radio receiver for cellular radio telecommunications systems as claimed in claim 8, wherein the cordless base station and the cordless mobile part are cordless devices for transmitting radio messages in accordance with the DECT Standard.

10. The mobile radio receiver for cellular radio telecommunications systems as claimed in claim 1, wherein the cellular radio telecommunications system is a cellular mobile radio telecommunications system, the stationary radio transmitter is a mobile radio base station, and the mobile radio receiver is a mobile radio mobile part.

11. The mobile radio receiver for cellular radio telecommunications systems as claimed in claim 10, wherein the mobile radio base station and the mobile radio mobile part are mobile radio devices for transmitting radio messages in accordance with the GSM Standard.

12. A mobile radio receiver for cellular radio telecommunications systems, comprising:

a plurality of stationary radio transmitters that communicate with one another, the stationary radio transmitters being arranged in radio cells of the radio telecommunications system for radio-cell-related transmission of radio messages which are included in a multiplex structure having a plurality of structure elements and allow telecommunications connections to be set up between the stationary radio transmitters and a mobile radio receiver each of the stationary radio transmitters connected to a telecommunications network, synchronously or asynchronously with respect to one another, via a switching center;

a functional unit having first means for receiving and processing the radio messages, second means for producing and controlling the radio links to the stationary radio transmitters, and third means for detecting and evaluating additional information which indicates radio link quality and is contained in the radio messages;

a first radio link, produced and maintained, to a first stationary radio transmitter based on receiving a first radio message which is included in first structure elements of the multiplex structure, this first radio link being used as a telecommunications link;

the first means, second means and third means are structured and connected to one another such that in addition to the first radio link, at least one second radio link to at least one second stationary radio transmitter is produced and maintained in the background based on receiving radio messages which are included in second to n-th structure elements of the multiplex structure, which second radio link is useable as a telecommunications link, depending on a comparison between link quality of the first radio link and link quality of the second radio link, a respective link quality being determined from evaluation of respective radio-link-specific additional information, either the first radio link continuing to be used as the telecommunications link, or the second radio link being used as a new telecommunications link;

the second means having a counting device and an offset store which is allocated to this counting device.

13. The mobile radio receiver for cellular radio telecommunications systems as claimed in claim 12, wherein the first means, second means and third means are structured and connected to one another such that the second radio link or links to the second stationary radio transmitter or transmitters is or are produced and maintained as a function of at least one predetermined additional-information-related threshold value being exceeded by an additional information value, which is obtained from additional information received with the radio messages via the first radio link.

14. The mobile radio receiver for cellular radio telecommunications systems as claimed in claim 12, wherein the first means, second means and third means are structured and connected to one another such that the second radio link or links to the second stationary radio transmitter or transmitters is or are produced and maintained as a function of at least one predetermined additional-information-related threshold value being undershot by an additional information value, which is obtained from additional information received with the radio messages via the first radio link.

15. The mobile radio receiver for cellular radio telecommunications systems as claimed in claim 12, wherein the telecommunications network is one of a public telephone network, ISDN network, private telecommunications network, mobile radio network or satellite radio network, and wherein the switching center is a private branch exchange.

16. The mobile radio receiver for cellular radio telecommunications systems as claimed in claim 12, wherein wanted information transmitted over the telecommunications link represents at least one of spoken words, written words and images.

17. The mobile radio receiver for cellular radio telecommunications systems as claimed in claim 12, wherein the multiplex structure is an FDMA/TDMA/TDD structure, and wherein the structure elements contained in the multiplex structure are time slots/channels.

18. The mobile receiver for cellular radio telecommunications systems as claimed in claim 12, wherein the cellular radio telecommunications system is a cellular telecommunications system, the stationary radio transmitter is a cordless base station, and the mobile radio receiver is a cordless mobile part.

19. The mobile radio receiver for cellular radio telecommunications systems as claimed in claim 18, wherein the cordless base station and the cordless mobile part are cordless devices for transmitting radio messages in accordance with the DECT Standard.

20. The mobile radio receiver for cellular radio telecommunications systems as claimed in claim 12, wherein the cellular radio telecommunications system is a cellular mobile radio telecommunications system, the stationary radio transmitter is a mobile radio base station, and the mobile radio receiver is a mobile radio mobile part.

21. The mobile radio receiver for cellular radio telecommunications systems as claimed in claim 20, wherein the mobile radio base station and the mobile radio mobile part are mobile radio devices for transmitting radio messages in accordance with the GSM Standard.

* * * * *